Aug. 30, 1949.  E. STEWART  2,480,270
HYDRAULIC BRAKE
Filed Nov. 10, 1945  3 Sheets-Sheet 1
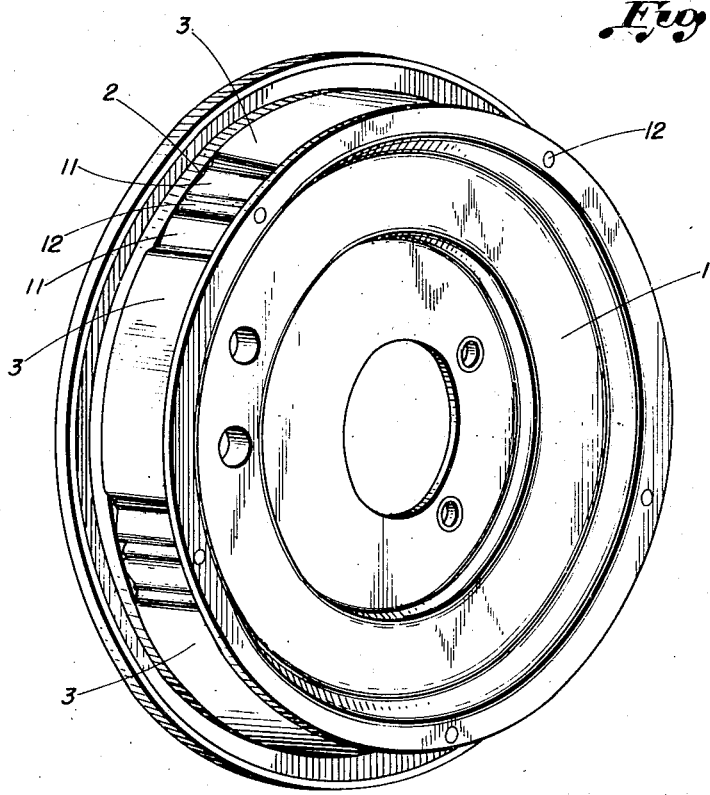
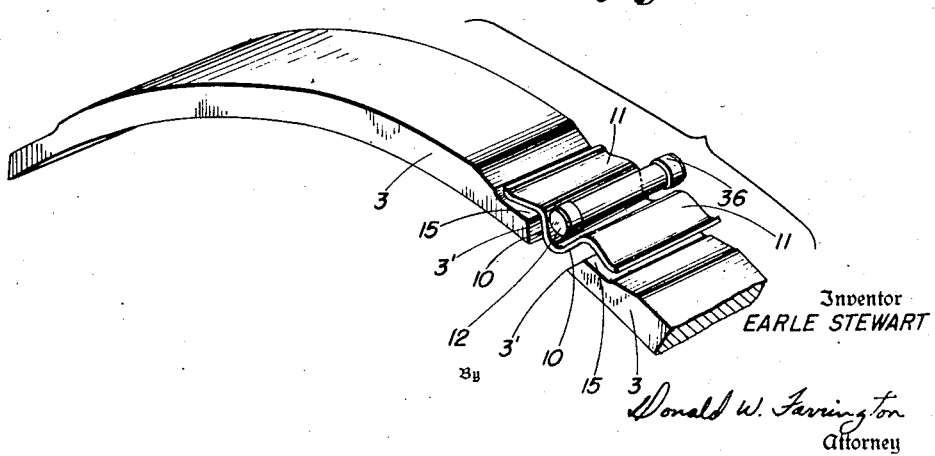
Inventor
EARLE STEWART
By Donald W. Farrington
Attorney

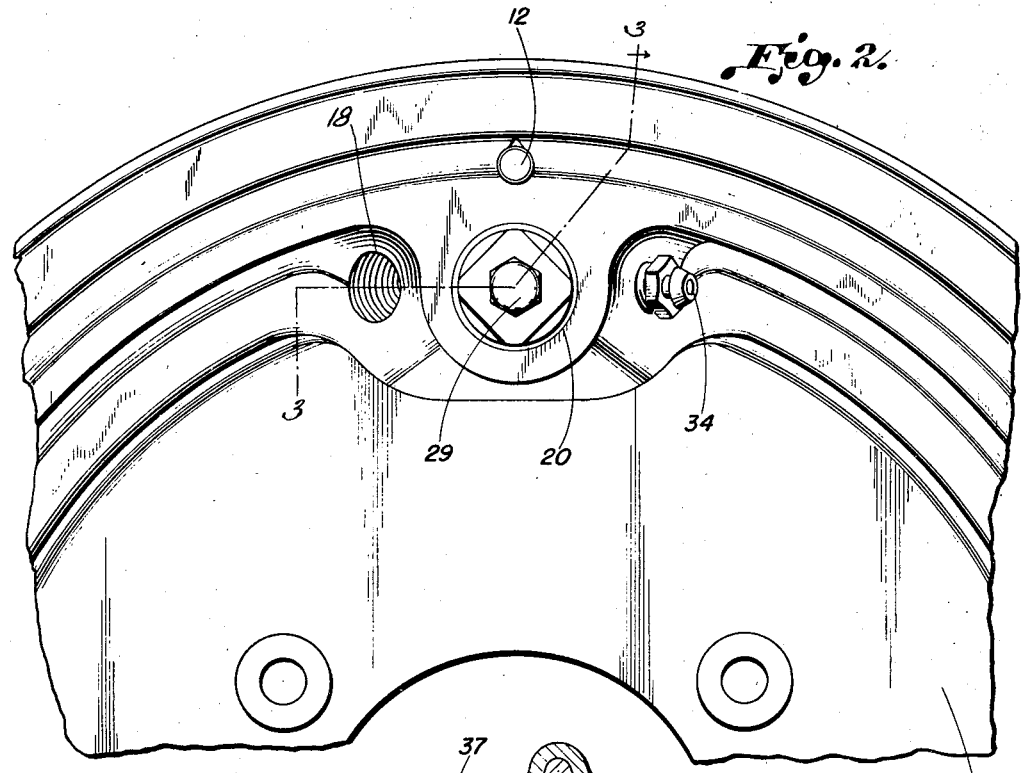
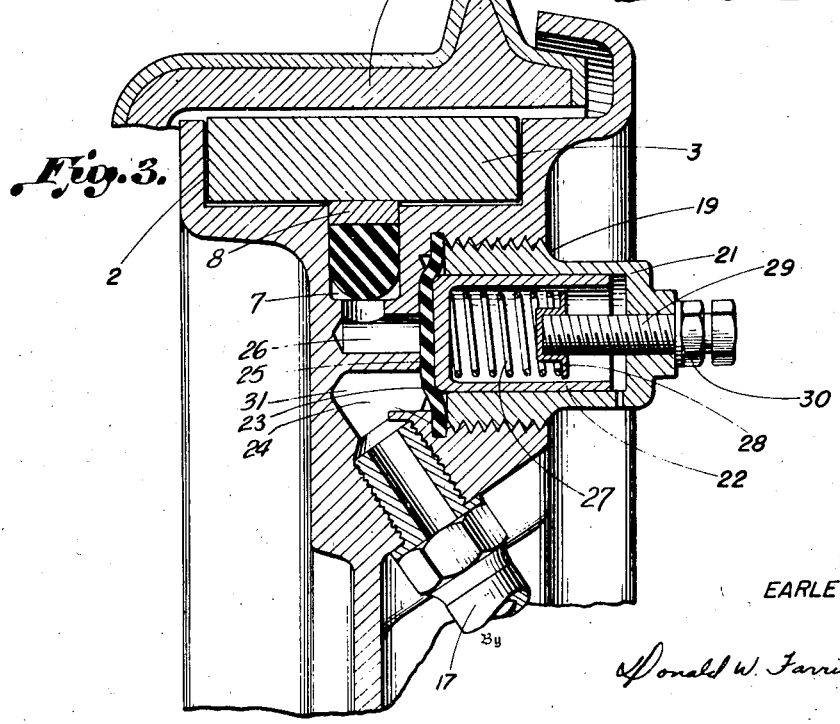

Aug. 30, 1949.  E. STEWART  2,480,270
HYDRAULIC BRAKE
Filed Nov. 10, 1945  3 Sheets-Sheet 3
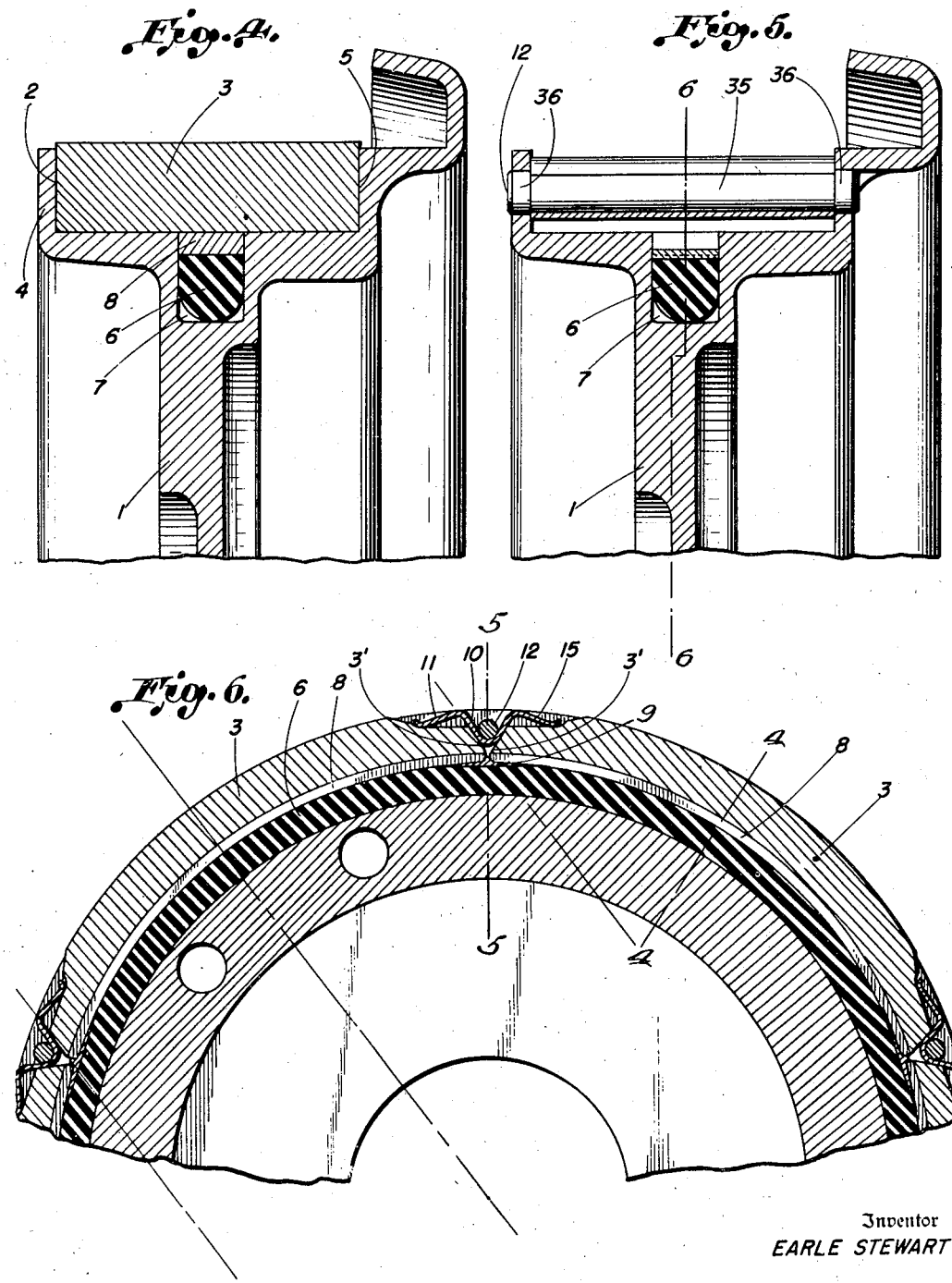
Inventor
EARLE STEWART
By Donald W. Farrington
Attorney Patented Aug. 30, 1949

2,480,270

UNITED STATES PATENT OFFICE 2,480,270

HYDRAULIC BRAKE

Earle Stewart, Baltimore, Md., assignor to The Glenn L. Martin Company, Middle River, Md., a corporation of Maryland Application November 10, 1945, Serial No. 627,917

4 Claims. (Cl. 188—152)

This invention generally relates to an improved hydraulic brake and more particularly to features of the brake block mounting and expander structure which are improvements over the brake described in co-pending application, Serial No. 507,986, filed October 28, 1943, now Patent Number 2,390,311, dated December 4, 1945.

The brake herein described is of a class generally referred to as hydraulic brakes, in that the actuating mechanism is operated by a hydraulic fluid pressure. In brakes of this type, it is necessary that the brake block be forced against the brake drum with enough force to stop the rotation of the drum which is usually mounted on the wheel of a vehicle, within a predetermined time and with a minimum of lag between the actuation of the brake pedal and the application of the braking force of the brake block on the brake drum. In other words, as soon as the brake pedal is depressed the effect of the brake and the feel of the brake should be immediately noticeable in the brake pedal of the vehicle. In most hydraulic brakes there is a noticeable lag between the operation of the brake pedal and the braking action of the brake blocks due to the time required to move a relatively large volume of fluid in the fluid pressure system.

An object of this invention is to provide a hydraulic brake of greater efficiency and of simple and rugged construction.

Another object of this invention is the provision of a brake block mounting in a hydraulic brake that will prevent end-play and chatter upon braking.

Another object of this invention is the provision of brake blocks, the ends of which are sloped parallel with the plane through the center of the brake and through the center of the brake actuator assembly, and supporting these blocks between similarly inclined members fixed to the mounting member so that the brake blocks will move radially but be restrained from peripheral motion.

Another object of the invention is to provide a simple and readily removable mounting for the brake block that affords a return force on the brake block after braking.

Another object of this invention is the provision for individual adjustment on each brake actuator, whereby the brake blocks may be caused to float in the supporting member or in other words, be held in any desired predetermined position relative to the brake drum.

Further and other objects will become apparent from the accompanying description and drawings which form part of this disclosure in which like numerals refer to like parts.

In the drawings:

Figure 1 is a view of the brake actuator assembly.

Figure 2 is a fragmentary view showing the fluid connections and the brake block adjustment.

Figure 3 is a section taken on line 3—3 of Figure 2.

Figure 4 is a section taken on line 4—4 of Figure 6.

Figure 5 is a section taken on line 5—5 of Figure 6.

Figure 6 is a fragmentary sectional view taken on the line 6—6 of Figure 5.

Figure 7 is an exploded view of the brake blocks showing the relationship of the retracting spring to the ends of the blocks.

The brake actuator shown in Figure 1 is adapted to be attached to a flange on the axle of the wheel of any vehicle. In the usual application, a brake drum 37 will be mounted on the wheel of the vehicle and fit over the brake actuator in the conventional manner.

This invention is primarily concerned with the brake block actuator unit. The unit illustrated in the drawings consists of a mounting member 1 having an annular channel 2 formed in the periphery thereof to receive the brake blocks 3 and support the block expander mechanism. As shown more clearly in Figure 4, brake blocks 3 fit in channel 2 with a sliding fit between the side walls 4 and 5 of the channel. As described in the co-pending application mentioned above, brake blocks 3 are moved radially by hydraulic pressure acting upon a resilient annular gasket 6. This gasket is mounted in groove 7. The side walls of groove 7 are substantially parallel or may be formed with a slight taper. Thrust members 8 form a segmental ring that extends around the groove between the resilient gasket 6 and the brake blocks 3. The fluid pressure in groove 7 expands the resilient gasket 6 and thrust members 8 move radially to force brake blocks 3 against the brake drum. A member 9, the width of groove 7, fits between the adjacent ends of segments 8 to prevent the extrusion of gasket 6 when forced outwardly of the groove by hydraulic pressure. The two ends of member 9 under segments 8 are feather-edged to prevent any damage to the gasket.

In Figure 6, it will be seen that the ends of brake blocks 3 are sloped, as shown at 3', so that the end faces thereof form planes that are parallel to the center line of the brake actuator assembly. The spring members which act as both torque reaction members and return springs comprise inclined portions 10 and leaf spring portions 11. In the operative position in the assembly, pins 12 locate the spring members so that portions 10 form an abutment for the inclined ends of the brake blocks 3. It will be noted from Figure 6 that as elastic member 6 moves brake block 3 radially the block moves along its center line which extends through the axis of the assembly and the inclined end portions 3' move parallel with the center line along the inner faces of portions 10 of the spring. The ends of the blocks move so that they are continuously supported between portions 10 of two adjacent springs. In this way each block is free to move radially of the assembly but is restrained from moving around the periphery of the brake actuator. Since portions 10 of the springs are retained in place by pins 12, the portions 10 of the springs and pins 12 absorb the torque reaction of the brake actuator. That is, as the brake drum moves around the brake blocks in either direction and the brake blocks are expanded into a braking position against the drum, they will be subjected to a torque and since the brake blocks are continuously supported on each end by the inner faces of portions 10 of the springs the torque load will be directly transmitted to pins 12 and there will be no tendency to chatter or vibrate as each block 3 is restrained at its ends.

Portions 11 of the leaf spring rest in cut-out portion 15 of the brake block so as not to extend above sides 4 and 5 and afford a return force on the ends of the brake blocks. As the fluid pressure expands gasket 6, the brake blocks are forced outwardly against the force of spring portions 11. When the fluid pressure is relieved leaf spring portions 11 afford a return force to cause brake blocks 3 to be retracted from engagement with the drums, that is, the fluid pressure causes blocks 3 to move radially and exert a braking force on the brake drum and that outward radial motion is resisted by the return springs 11. When the fluid pressure decreases so that the force on the brake blocks exerted by the fluid pressure is less than that exerted by the return springs, the brake blocks will be forced into the bottom of channel 2. After the brake blocks have been worn, it will take more and more fluid to move the blocks into a braking position. This condition is undesirable because the larger the volume of fluid transferred through the system, the greater the lag in the braking system. Therefore, the adjustment shown in Figure 3 is inserted in the fluid pressure line to compensate for wear as each brake block wears. Fluid pressure line 17 is connected to opening 18 in mounting member 1. A plug 19 is threaded into an opening 20 in the mounting member located between fluid connection 18 and fluid valve 34. This plug comprises a cylinder 21 and a piston 22. The bottom of plug 19 is flat and serves to retain diaphragm 23 against shoulders 24 formed at the bottom of opening 20. Portion 25 around hole 26 serves as a seat and diaphragm 23 is pressed against seat 25 to form a valve for the hydraulic fluid in the brake line. Spring 27 extends between the bottom of piston 22 and collar 28. As bolt 29 is adjusted, the tension on spring 27 is varied and thereby the pressure exerted by piston 22 which holds the diaphragm against seat 25 is varied. Lock nut 30 is used to lock bolt 29 in a predetermined position. It can be seen from Figure 3 that diaphragm 23 is subject to several forces. When fluid flows from line 17 into chamber 31, fluid pressure acting on diaphragm 23 causes the piston 22 to move inwardly of housing 21 and fluid will flow from chamber 31 between surface 25 and diaphragm 23 into chamber 26 and groove 7 to actuate brake block 3. When the pressure is relieved in chamber 31, the pressure in chamber 26 exerts a force on diaphragm 23 which causes the fluid to flow past the diaphragm so that the brake block 3 may be moved into channel 2 by portions 11 of the leaf spring. Upon relieving the pressure in line 17 the only pressure on the fluid in chamber 26 which is in turn exerted upon diaphragm 23 is derived from portions 11 of the leaf springs. Portions 11 of the leaf spring afford the greatest return force in their positions of maximum distortion, that is, when blocks 3 are in engagement with the drum, and the force exerted by the springs decreases as the springs return block 3 to the bottom of the channel 2. Therefore, if the spring tension of spring 27 is so adjusted that the force on the diaphragm exceeds the force exerted by springs 11 the fluid will not pass from chamber 26 to chamber 31 and the blocks will not retract. If the spring tension of spring 27 is considerably less than the force exerted by springs 11 the fluid from chamber 26 will be forced against the diaphragm quite readily into chamber 31. It can, therefore, be seen that by adjusting spring tension 27 the force of springs 11 may be balanced to any desired degree.

The mechanism above described can be built into each brake actuator and as wear is encountered on any brake, the brake blocks may be adjusted on that particular brake. It can be seen that by adjusting the tension in spring 27 the brake blocks 3 can practically be made to float in channel 2 and any desired clearance between the brake blocks and the drum may be maintained.

Due to the fact that the radial motion of the ends of brake blocks 3 is very slight, the pressure between the ends of the blocks and portions 10 of the spring is almost entirely static pressure and with blocks of suitable resistance to a compressive load there is little or no wear with this construction and therefore there is no tendency to chatter during the life of the brake block because the ends of the block as described above are restrained between portions 10 of the supporting springs.

The manner of affording the removal and replacement of brake blocks and springs by means of pin 12 is most clearly shown in Figures 2 and 5. The central portion 35 of pin 12 is of slightly less diameter than portions 36 on the ends of the pin. When the spring is in place it tends to exert a force on pin 12 outwardly of channel 2 and thereby affords a restraining force on pin 12 to prevent the pin from inadvertently moving out of place. The shoulder between portions 35 and 36 need be only a few thousandths of an inch to achieve this result. It can readily be seen that if the spring is slightly depressed, pin 12 may be readily removed.

As pointed out in the co-pending application mentioned above, the resilient elastic gasket 6 is of a synthetic rubber or elastomeric material which has the physical properties of rubber but it also has the ability to resist the action of oil or oil compounds that may be used as hydraulic fluid. As the hydraulic fluid pressure in channel 7 is increased, the seal 6 is deformed to exert a large radial force against the thrust members which is transmitted to the brake blocks and secondary forces which are exerted laterally of the seal to prevent the escape of hydraulic fluid along the edges of the seal.

Brake blocks 3 may be of any brake block material which affords efficient braking action against the drums when urged outwardly. These brake blocks may be molded to form the ends to the proper shape and contour for immediate installations. The segmental ring 8 in the form illustrated in the drawings is a metal segmental thrust member placed in groove 7 over gasket 6, but it is to be understood that the segments can be secured to brake blocks 3 or the blocks can be formed with integral ribs.

It is to be understood that certain changes, alterations, modifications and substitutions can be made without departing from the spirit and scope of the appended claims.

I claim as my invention:

1. In a brake of the class described, a brake drum, brake blocks adapted to engage said brake drum, actuating means therefor comprising a cylindrical member backing said brake blocks, said member having a groove formed in the periphery thereof, passage means formed in said member interconnecting said groove and affording communication with a source of fluid pressure, a resilient elastic gasket positioned in said groove substantially filling the same whereby said gasket may be moved radially in said groove to move said brake blocks against said brake drum, said brake blocks having the end portions thereof formed as inclined, flat surfaces lying parallel to the radial axis through the center of said brake blocks, abutment members secured to the cylindrical member and having similarly inclined flat abutments faces extending substantially across the width of the blocks, said inclined ends of said brake blocks abutting said abutment faces to permit radial motion of the brake blocks but prevent peripheral motion.

2. A radial brake actuator assembly comprising an outwardly opening channel-shaped rim, an annular member supported within said channel and having a narrow channel at the outer face thereof as compared with said first channel, an annular sealing ring adapted to be supported in said second channel and capable of radial expansion and contraction, radial movable brake blocks supported in said first channel, and means to direct fluid under pressure into said second channel against said sealing ring to radially move the same to actuate said brake blocks, spring members positioned in said channel member transverse of said brake blocks, said spring members having portions to engage the ends of said brake blocks to restrain said blocks upon radial movement thereof and other portions against which the ends of the blocks continually abut during radial movement to restrain peripheral motion thereof and absorb braking torque.

3. A radial brake actuator assembly comprising an outwardly opening channel-shaped rim, an annular member supported within said channel and having a narrow channel at the outer face thereof as compared with said first channel, an annular sealing ring adapted to be supported in said second channel and capable of radial expansion and contraction, radial expansible brake elements supported in said first channel, means to direct fluid under pressure into said second channel against said sealing ring to radially expand the same to move said brake elements outwardly, leaf spring members positioned in said channel members transversely of the ends of said brake elements, said spring members restraining the ends of said brake elements against radial motion, said spring elements abutting the ends of said brake elements to prevent peripheral motion, said spring elements affording the return force on said brake elements when the fluid pressure is relieved.

4. A radial brake assembly comprising a channel-shaped rim, brake blocks supported in said rim for said radial movement, means defining an annular channel disposed radially inwardly from said brake blocks and opening radially outwardly, a pressure sealing member disposed in said channel portion adapted to be radially expanded and contracted by hydraulic pressure to actuate said brake blocks radially, brake block supporting members held against peripheral motion along said first mentioned channel and positioned transversely thereof at opposite ends of each block, the sides of said members being inclined in planes parallel to a radial plane through the center of the associated brake block to provide flat surfaces extending substantially the full width of said block, the ends of said brake block being formed in similar planes and abutting the sides of said supporting members so that the brake blocks may move radially while fully supported at the ends against peripheral motion.

EARLE STEWART.

REFERENCES CITED

The following references are of record in the file of this patent:

UNITED STATES PATENTS

| Number | Name | Date |
| --- | --- | --- |
| 1,723,141 | Down | Aug. 6, 1929 |
| 2,243,229 | Tarris | May 27, 1941 |
| 2,281,538 | Leichsenring | Apr. 28, 1942 |
| 2,390,311 | Kupiec et al. | Dec. 4, 1945 |
| 2,410,029 | Hollerith | Oct. 29, 1946 |

FOREIGN PATENTS

| Number | Country | Date |
| --- | --- | --- |
| 22,443 | Great Britain | 1909 |